(12) United States Patent
Yu et al.

(10) Patent No.: US 8,203,121 B2
(45) Date of Patent: Jun. 19, 2012

(54) RADIATION DETECTOR STAND

(75) Inventors: Juhyun Yu, Mito (JP); Yoshinori Sunaga, Hitachinaka (JP); Hidetaka Kawauchi, Hitachi (JP); Shinichi Inoue, Ryugasaki (JP); Isao Takahashi, Hitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 257 days.

(21) Appl. No.: 12/458,205

(22) Filed: Jul. 2, 2009

(65) Prior Publication Data

US 2010/0200780 A1     Aug. 12, 2010

(30) Foreign Application Priority Data

Feb. 12, 2009 (JP) ................................. 2009-029669

(51) Int. Cl.
*G01J 1/00* (2006.01)

(52) U.S. Cl. .................................. 250/336.1; 250/522.1
(58) Field of Classification Search ............... 250/522.1, 250/336.1
See application file for complete search history.

(56) References Cited

U.S. PATENT DOCUMENTS 4,491,732 A * 1/1985 Pritzkow et al. .............. 250/366
6,236,051 B1  5/2001 Yamakawa et al.

* cited by examiner

*Primary Examiner* — David Porta
*Assistant Examiner* — Hugh H Maupin
(74) *Attorney, Agent, or Firm* — Crowell & Moring LLP

(57) ABSTRACT

A radiation detector stand has a first support having a plurality of first trenches to which a plurality of radiation detectors for detecting a radiation are inserted, and a second support arranged in parallel to the first support. The first trenches are arranged at a predetermined interval corresponding to an interval of arranging the radiation detectors. The second support has a plurality of second trenches to which the radiation detectors are inserted, and the second trenches are arranged at the predetermined interval.

11 Claims, 13 Drawing Sheets

RADIATION DETECTOR STAND

The present application is based on Japanese Patent Application No. 2009-029669 filed on Feb. 12, 2009, the entire contents of which are incorporated herein by reference.

BACKGROUND OF THE INVENTION

1. Field of the Invention

The present invention relates to a radiation detector stand, more particularly, to a radiation detector stand into which a card type radiation detector is inserted.

2. Related Art

Various conventional radiation detectors have been known, and U.S. Pat. No. 6,236,051 discloses an example of such conventional radiation detectors. According to disclosure of U.S. Pat. No. 6,236,051, the radiation detector comprises a plurality of common electrode plates, a plurality of semiconductor cells, and a plurality of electrode plates. This radiation detector has a laminated body between two frames, one of the frames and the other one of the frames are fixed with each other by pins. Herein, the laminated body is formed by accumulating the common electrode plates, the semiconductor cells and the electrode plate, in which one common electrode plate, one semiconductor cell, one electrode plate, another semiconductor cell, another common electrode plate and the like are accumulated in this order.

According to the radiation detector disclosed by U.S. Pat. No. 6,236,051, because a pair of semiconductor cells adjacent in X-direction shares the common electrode plate, it is possible to decrease a dead zone where radiation cannot be detected, thereby improving a radiation detection efficiency.

However, in the conventional radiation detector such as the radiation detector disclosed by U.S. Pat. No. 6,236,051, it is difficult to arrange the plurality of semiconductor cells in a high density, while strictly controlling an interval between semiconductor cells to be a predetermined length, since a plurality of components such as the common electrode plates and the semiconductor cells are accumulated for assembling the radiation detector, so that the dimension error of each component is added every time the component is accumulated.

SUMMARY OF THE INVENTION

Accordingly, it is an object of the present invention to provide a radiation detector stand, in which a plurality of radiation detectors can be arranged with a high positional precision.

According to a feature of the present invention, a radiation detector stand comprises:

a first support having a plurality of first trenches to which a plurality of radiation detectors for detecting a radiation are inserted, the first trenches being arranged at a predetermined interval corresponding to an interval of arranging the radiation detectors; and a second support arranged in parallel to the first support, the second support having a plurality of second trenches to which the radiation detectors are inserted, the second trenches being arranged at the predetermined interval.

The radiation detector stand may further comprise elastic members placed between each of the first trenches and each of the radiation detectors and between each of the second trenches and each of the radiation detectors, wherein the elastic members presses each of the radiation detectors to the first support and the second support.

In the radiation detector stand, the first trenches and the second trenches are formed respectively between a plurality of wall portions, each of the wall portions contains a flat side and a locking depression formed on a surface opposed to the flat side, in which each of the elastic members is formed with a shape corresponding to the locking depression, and each of the elastic members can press the radiation detector to the flat side.

In the radiation detector, the first support and the second support may be respectively formed from a metal material.

The radiation detector stand may further comprise:

a support plate mounting the first support and the second support, and a plurality of connection members connected to the radiation detectors respectively and provided between the first support and the second support, the connection members connecting an exterior electric circuit with the radiation detectors.

The method for fabricating a superconducting wire according to claim 3, wherein the locking depression has a first slope and a second slope with an inclination shaper than that of the first slope.

ADVANTAGES OF THE INVENTION

According to the present invention, it is possible to provide a radiation detector stand, in which a plurality of radiation detector can be arranged with a high positional precision.

BRIEF DESCRIPTION OF THE DRAWINGS

Next, a preferred embodiment according to the invention will be explained in conjunction with appended drawings, wherein.

DETAILED DESCRIPTION OF THE PREFERRED EMBODIMENT

Next, a preferred embodiment according to the present invention will be explained in more detail in conjunction with appended drawings.

Preferred Embodiment

Figure 1A:
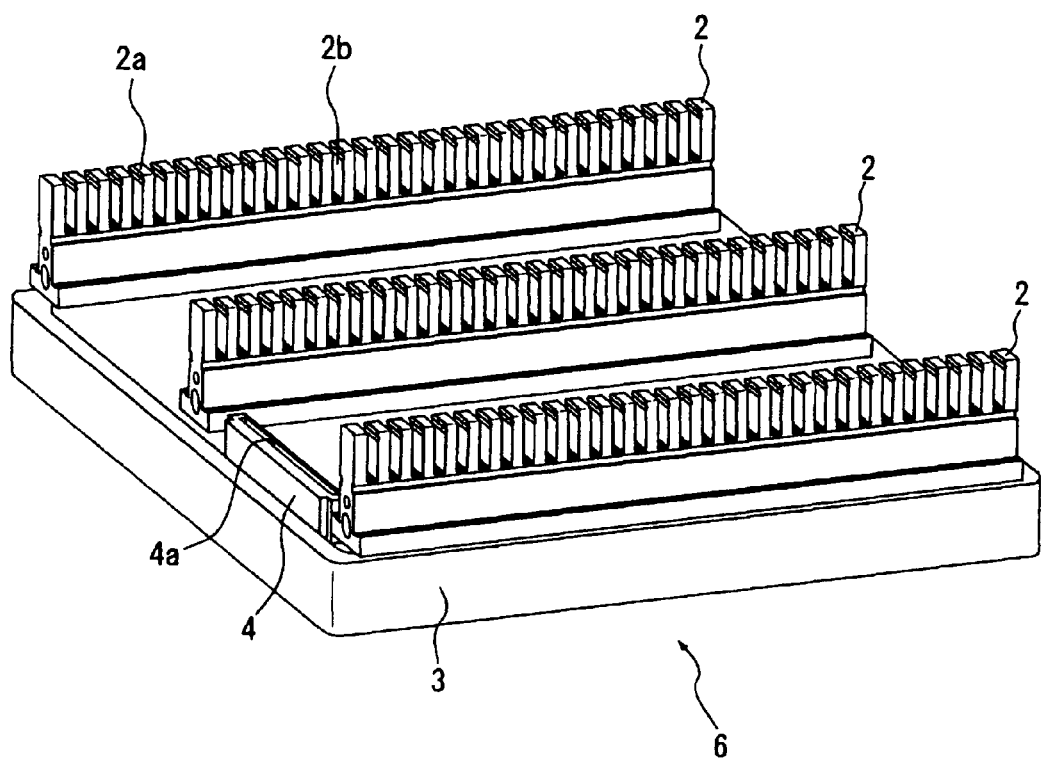
FIG. 1A is a schematic view of a radiation detector stand in an embodiment according to the present invention.
Figure 1B:
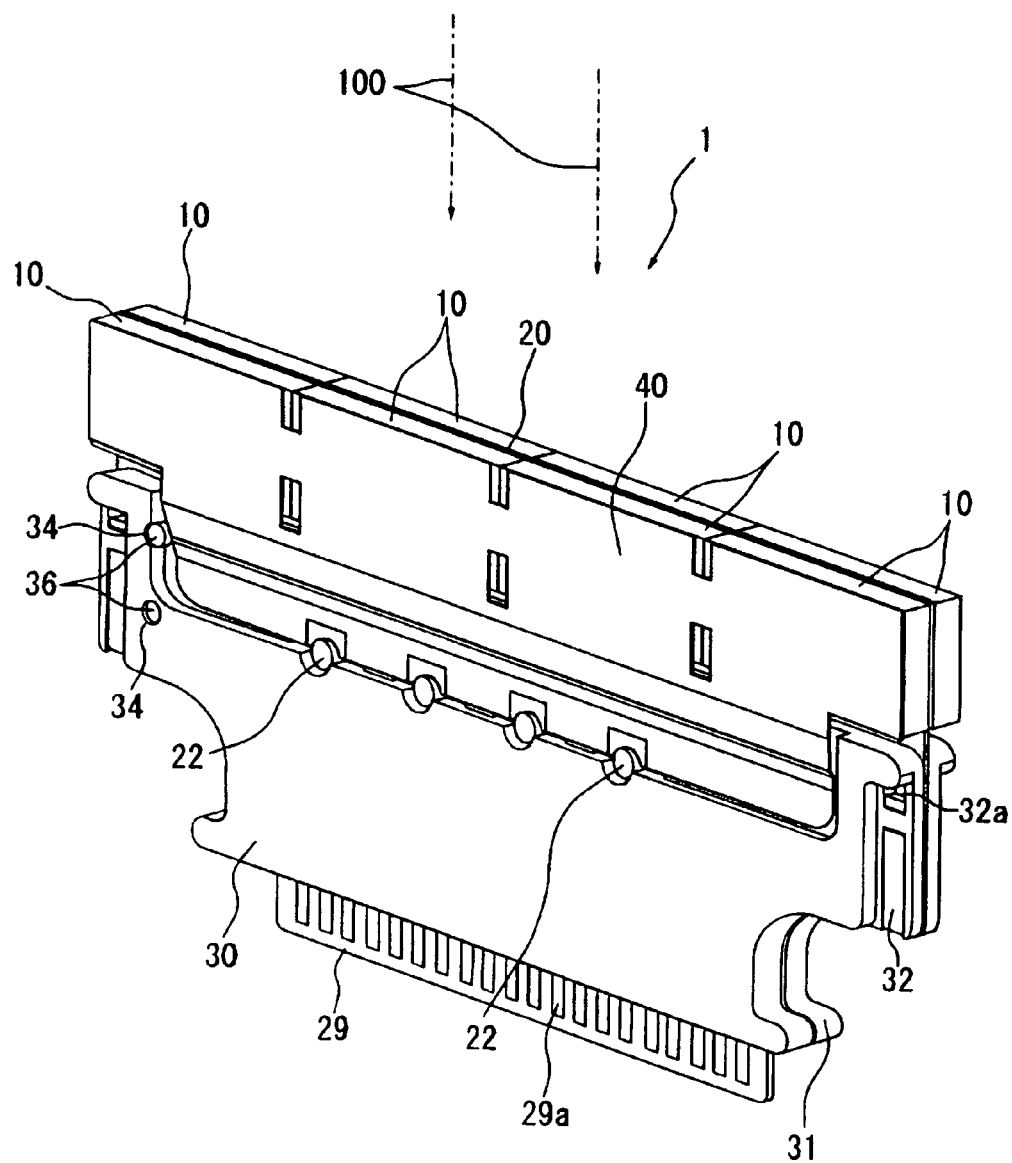
FIG. 1B is a perspective view of a radiation detector which is to be fixed to the radiation detector stand in the embodiment according to the present invention.
Figure 1C:
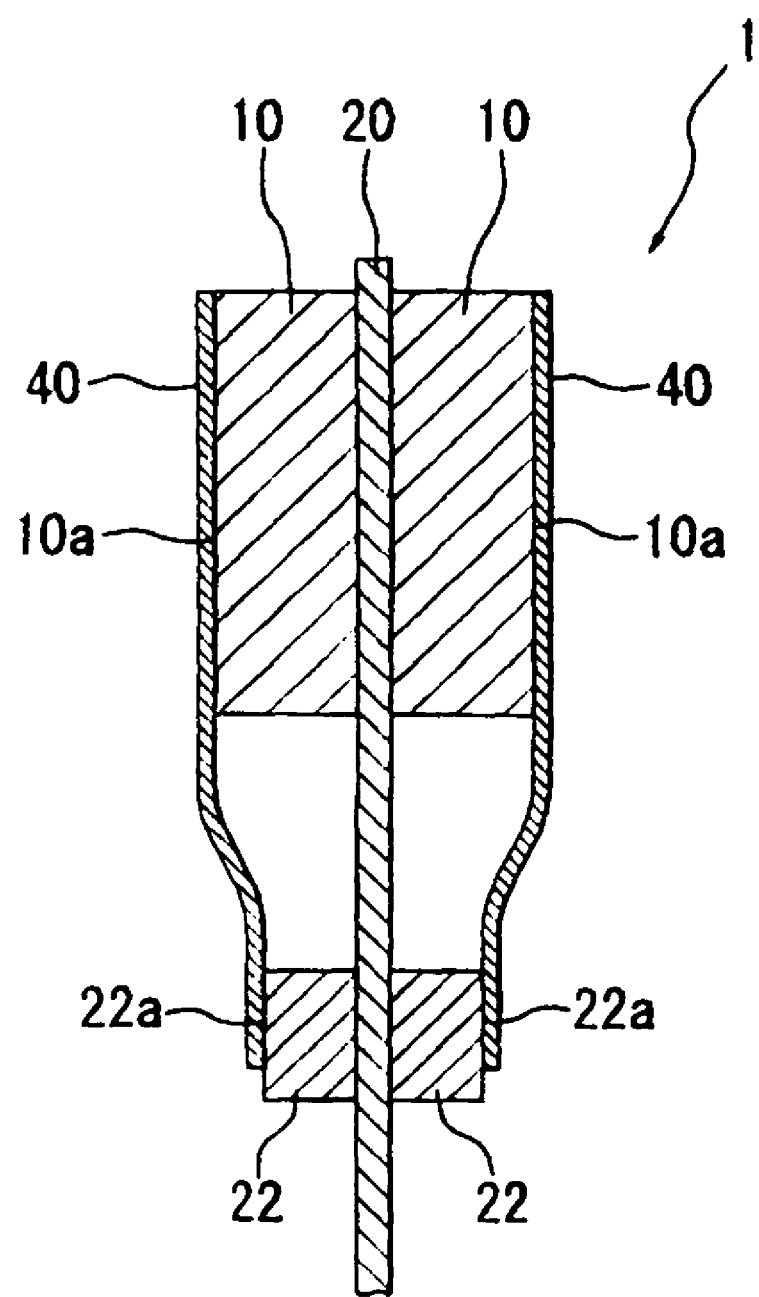
FIG. 1C is a partial cross sectional view of the radiation detector in the embodiment according to the present invention.
Figure 1D:
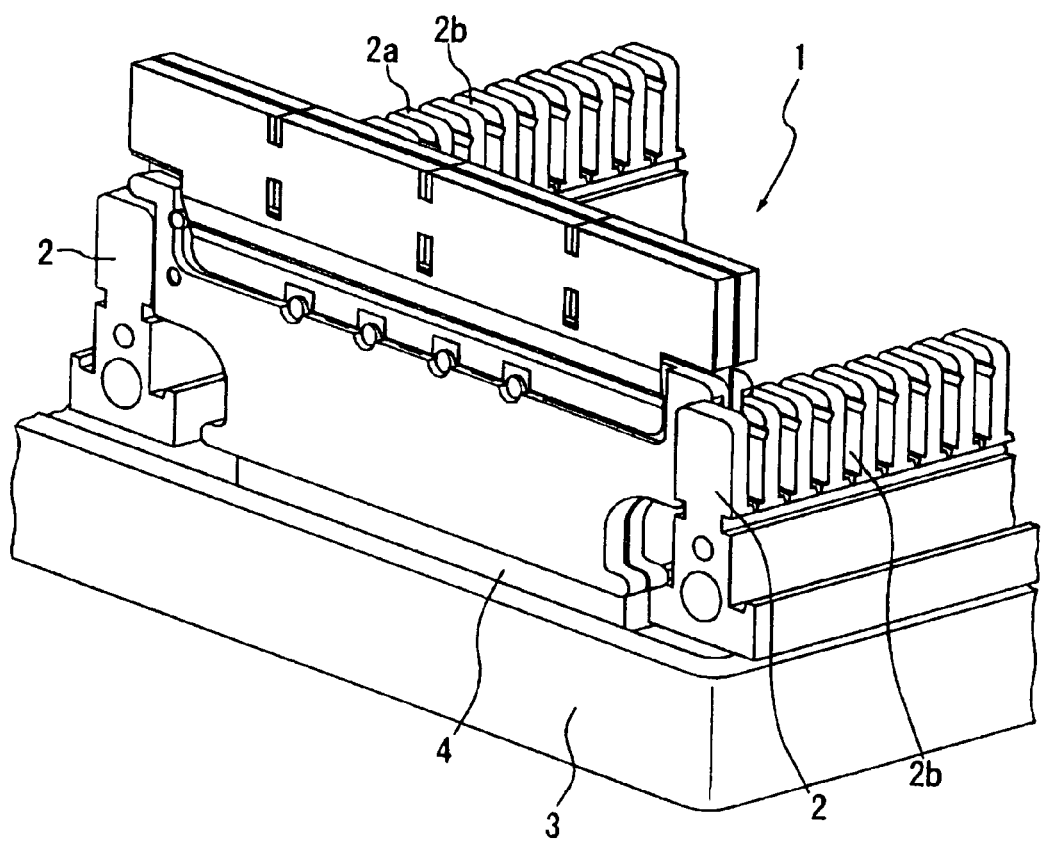
FIG. 1D is a schematic view of the radiation detector stand where the radiation detector is fixed in the embodiment according to the present invention.

FIG. 1A is a schematic view of a radiation detector stand in an embodiment according to the present invention, FIG. 1B is a perspective view of a radiation detector which is to be fixed to the radiation detector stand in the embodiment according to the present invention, FIG. 1C is a partial cross sectional view of the radiation detector in the embodiment according to the present invention. In FIG. 1C, a card holder 30 and a card holder 31 are not shown for convenience sake of explanation. FIG. 1D is a schematic view of the radiation detector stand where the radiation detector is fixed in the embodiment according to the present invention.

(Brief Summary of a Radiation Detector Stand 6)

A radiation detector stand 6 in the embodiment according to the present invention supports a radiation detector which detects radiations such as gamma ray (γ ray) and X ray. Herein, in FIG. 1B, radiation 100 propagates from an upper side to a bottom side in space. Namely, the radiation 100 propagates along a direction facing to a card holder from semiconductor devices of a radiation detector 1 and arrives at the radiation detector 1.

The radiation detector 1 detects the radiation 100 at a side surface (in other words, surfaces which face to the upper side of FIG. 1B) of CdTe devices 10 as semiconductor devices. Therefore, the side surface of the CdTe devices 10 function as entrance faces of the radiation 100. In this embodiment, the radiation detector which has the side surface as the entrance face of the radiation 100 is described as an edge-on type radiation detector. As an example, the radiation detector stand 6 is a stand for the edge-on type radiation detectors 1, in which the edge-on type radiation detectors 1 are arranged. The radiation detectors 1 detect the radiation 100 through a collimator having a plurality of openings. The radiation 100 propagates along a specific direction (for example, in a direction from a test subject to the radiation detector 1) and through the openings of the collimator.

With referring to FIG. 1A, the radiation detector stand 6 in this embodiment comprises a support plate 3 such as a mother board, a plurality of supports 2 having a plurality of trenches 2b into which the radiation detectors 1 detecting the radiation such as γ ray are inserted, a plurality of the supports 2 are arranged at specified intervals on the support plate 3, and a plurality of connectors 4 located between the plurality of supports 2, into which the radiation detectors 1 are also inserted respectively. In more concrete, a bottom part of the radiation detector 1 is inserted into the connector 4 and side parts thereof are inserted into the trenches 2b at both sides. A plurality of the supports 2 are arranged parallel to one another at a regular interval according to a width of the radiation detector 1 as described below. A plurality of the trenches 2b are arranged at a predetermined interval corresponding to an interval of arranging the radiation detectors 1, and the trenches 2b are formed along a horizontal direction with respect to a normal direction of a surface of the support plate 3. The predetermined interval is greater than the width of the radiation detector 1 (specifically, a total of a width of the card holder 30, a width of the card holder 31, and a width of a substrate 20 described below).

In addition, with referring to FIG. 1A, only one connector 4 is shown for convenience sake of explanation, however a plurality of the connectors 4 are arranged on the support plate 3 at positions corresponding to respective positions of the trenches 2b in the embodiment.

The radiation detector 1 may comprise a collimator. Alternatively, the radiation detector 1 may comprise no collimator. For the case of using the collimator, a parallel multihole collimator, a pinhole collimator or the like may be used as the collimator. In this embodiment, as an example, the parallel multihole collimator is used as the collimator.

(Brief Summary of a Radiation Detector 1)

In accordance with the embodiment of the present invention, with referring to FIG. 1B, the radiation detector 1 to be inserted into the trench 2b of the radiation detector stand 6, for example, has a card shape. As an example, the radiation detector 1 comprises a pair of CdTe devices 10 as a pair of semiconductor devices which can detect the radiation 100 through the openings of the collimator, a thin substrate 20 having a thickness which is substantially equal to or not greater than a thickness of a wall which separates the plurality of openings of the collimator from each other, and the card holder 30 and the card holder 31 which support the substrate 20 by sandwiching at adjacent portions of the pair of CdTe devices 10. In this embodiment, four groups of the pair of CdTe devices 10 are fixed on the substrate 20 at positions for sandwiching the substrate 20. In other words, the pair of CdTe devices 10 of each group is fixed at symmetrical positions on the substrate 20. The pair of CdTe devices 10 of each group is fixed to one surface and the other surface of the substrate 20 at plane symmetrical positions in which the substrate 20 is a plane of symmetry. With referring to FIG. 1B, for example, each of the CdTe devices 10 is directly fixed on the substrate 20.

The substrate 20 is supported between the card holder 30 and the card holder 31 by sandwiching. The card holder 30 and the card holder 31 are respectively formed to have the same shape. Both the card holder 30 and the card holder 31 have grooved holes 34 and projection portions 36. The projection portion 36 of the card holder 31 fits in the grooved hole 34 of the card holder 30, and the projection portion 36 of the card holder 30 (not shown) fits in the grooved hole 34 of the card holder 31 (not shown), so that the card holder 30 and the card holder 31 supports the substrate 20.

An elastic member-mounting portion 32 and a concave portion 32a are parts where elastic members are provided, and the elastic members press the radiation detector 1 to a flat side of a wall portion 2a of the radiation detector stand 6 in the case where the radiation detector 1 is inserted into the trench 2b of the radiation detector stand 6, so that the radiation detector 1 is fixed to the radiation detector stand 6. In addition, when a card-edge 29 of the radiation detector 1 is inserted into the connector 4, the connector 4 is electrically connected to a pattern 29a, and the pattern 29a is electrically connected to an exterior control circuit, an exterior power wire, and/or grounding wire.

With referring to FIG. 1C, one side of wiring patterns (not shown) of a flexible substrate 40 is connected to a surface of a device 10a of the CdTe devices 10 with an electrically conductive adhesive. Also, the other side of the wiring patterns (not shown) of the flexible substrate 40 is connected to a terminal surface 22a of a substrate terminal 22 with the electrically conductive adhesive.

(Brief Summary of Insertion of the Radiation Detector 1 in the Radiation Detector Stand 6)

With referring to FIG. 1D, the radiation detector 1 is mounted perpendicularly to a surface of the support plate 3. Then, the radiation detector 1 is fixed in the trenches 2b of the radiation detector stand 6 by insertion of the both ends of the radiation detector 1. In more concrete, one end of the radiation detector 1 is inserted into the trench 2b as a first trench of a first support 2, and the other end of the radiation detector 1 is inserted into the trench 2b as a second trench of a second support 2 adjacent to the first support 2. In this manner, the radiation detector 1 is fixed to the radiation detector stand 6.

Specifically, both ends of the radiation detector 1 are inserted to the trenches 2b along the wall portion 2a, and the card holder 30 and the card holder 31 are fixed to the support 2 of the radiation detector stand 6 at the trenches 2b, simultaneously, the card-edge 29 is inserted to the connector 4. In addition, with referring to FIG. 1D, only one radiation detector 1 is shown for convenience sake of explanation, however the radiation detectors 1 are respectively inserted to the trenches 2b in accordance with an embodiment of the present invention.

(Details of the Radiation Detector 1)

Figure 2:
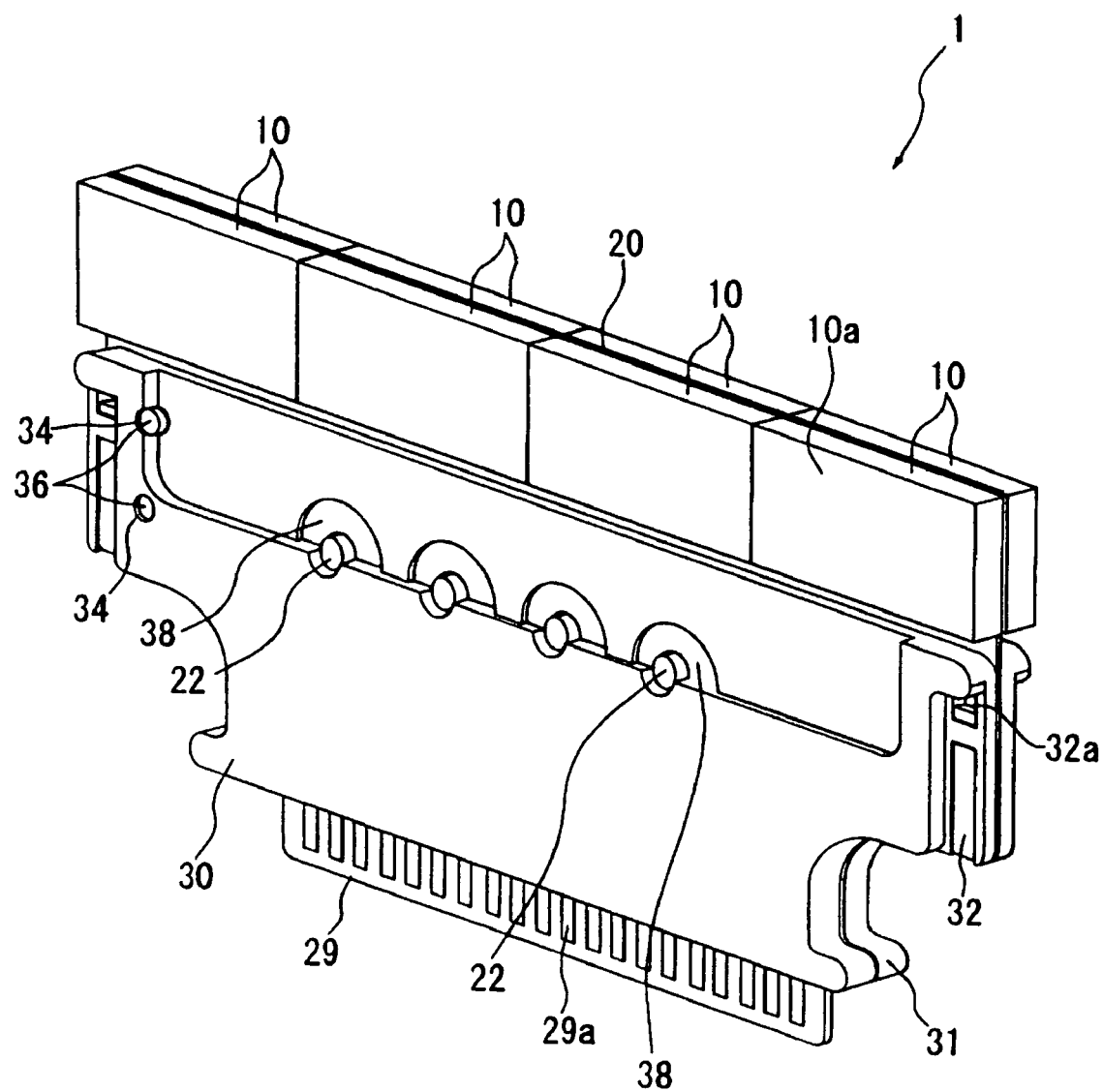
FIG. 2 is a perspective view of the radiation detector in the state a flexible substrate of the radiation detector is removed in the embodiment according to the present invention.

FIG. 2 is a perspective view of the radiation detector in the state a flexible substrate of the radiation detector is removed in the embodiment according to the present invention.

With referring to FIG. 1B and FIG. 2, the radiation detector 1 further comprises a flexible substrate 40 having wiring patterns on an opposite side of the substrate 20 of a pair of the CdTe devices 10, wherein electrode patterns of each of the CdTe devices 10 and the substrate terminals 22 are electrically connected with the wiring patterns of the flexible substrate 40 (an electrode pattern of the surface of device 10a provided on the other side of the substrate 20 of the CdTe devices 10 and the wiring pattern of the flexible substrate 40 at the side of the CdTe devices 10 are not shown).

The flexible substrates 40 are provided at both one side of the CdTe device 10 of a pair of the CdTe devices 10 and the other side of the CdTe device 10 of the pair of the CdTe devices 10 (for example, the flexible substrates 40 are provided at both one side of four groups of the pair of the CdTe devices 10 and the other side of four groups of the pair of the CdTe devices 10). In more concrete, one of the pair of the CdTe devices 10 is fixed to one surface of the substrate 20 at its surface, and an electrode pattern is formed on the other surface of the CdTe device 10, which is opposite to the surface fixed to the substrate 20. Similarly, the other one of the pair of the CdTe devices 10 is fixed to the other surface of the substrate 20 at its surface, and an electrode pattern is formed on the other surface of the CdTe device 10, which is opposite to the surface fixed to the substrate 20.

The flexible substrate 40, which has wiring patterns connected with the electrode pattern of one of CdTe devices 10, covers surfaces of one of CdTe devices 10 and a part of the card holder 30. In more concrete, the electrode pattern of one of CdTe devices 10 is connected to a first end of the wiring pattern of the flexible substrate 40, and a second end of the wiring pattern is electrically connected to the substrate terminal 22 at a connection 38, and the flexible substrate 40 covers around the connection 38. The flexible substrate 40 having the wiring pattern which is connected to the electrode pattern of the other CdTe devices 10 is similar to the above.

Figure 3:
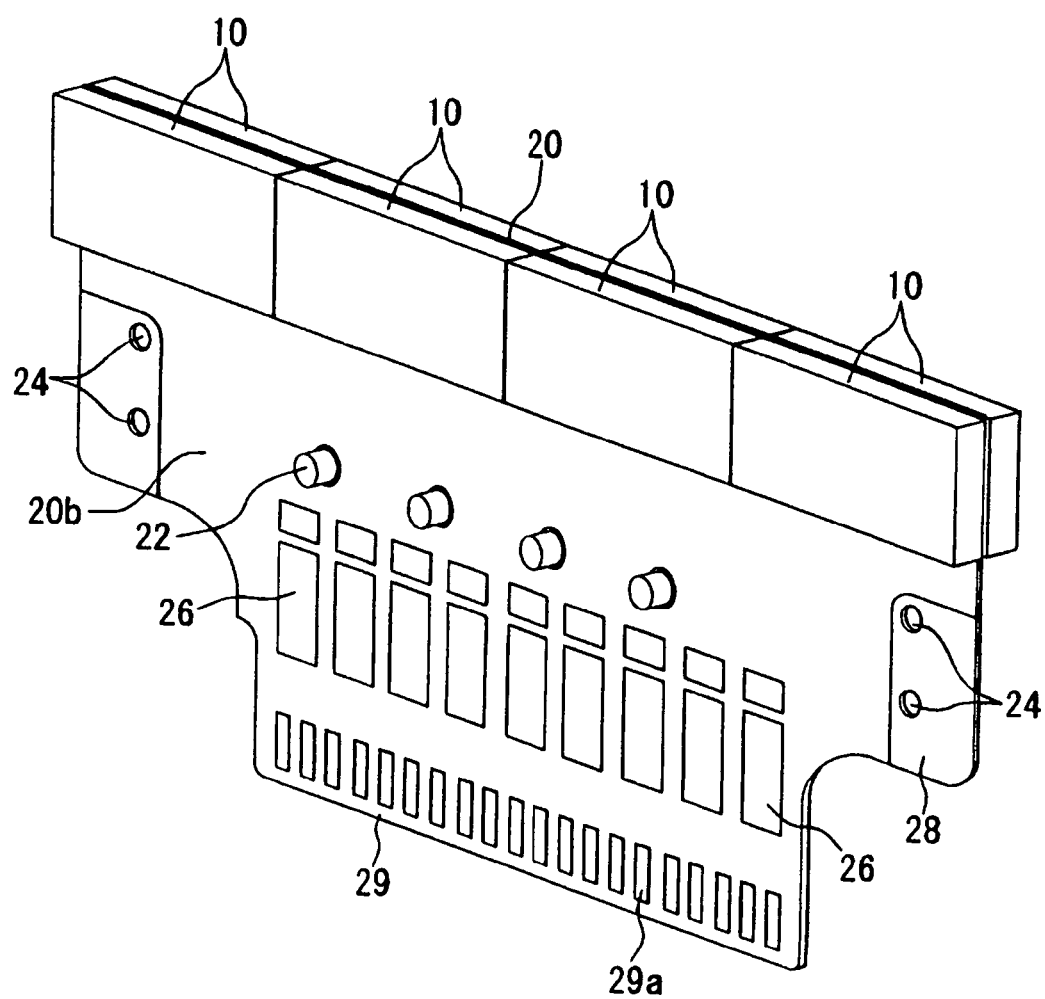
FIG. 3 is a perspective view of the radiation detector mounting a plurality of CdTe devices on a substrate in the embodiment according to the present invention.

FIG. 3 is a perspective view of the radiation detector mounting a plurality of CdTe devices on a substrate in the embodiment according to the present invention.

(Details of the Substrate 20)

The substrate 20 of the radiation detector 1 is formed by sandwiching a thin substrate between insulated layers 20b comprising an insulating material such as solder mask. The thin substrate (e.g. a glass epoxy board such as FR4) has a conductive thin film on its surface, and the conductive thin film comprises a conducting material such as metallic conductor (e.g. a copper film). Further, the substrate 20 has flexibility and has a thickness which is substantially equal to or not greater than a thickness of a wall which separates a plurality of the openings of the collimator from each other. As an example, each of the openings of the collimator is formed into a roughly-quadrangular shape. A size of each of the openings is 1.2 mm on a side, and the respective openings are arranged in a matrix shape with a pitch of 1.4 mm. Therefore, in the collimator, a thickness of the wall which separates one opening from the other opening is 0.2 mm. For example, the substrate 20 has a thickness (for example, 0.2 mm) which is substantially equal to or not greater than a thickness of the wall which separates the openings from each other in the collimator.

Additionally, a width of a first end side of the substrate 20 mounting the CdTe devices 10 respectively is formed greater than a width of a second end side of the first end side, in which the second end side is opposite to the first end side mounting the CdTe devices 10. At the second end side, the substrate 20 is supported by the card holder 30 and the card holder 31. Further, in a part of a broadly formed region of the substrate 20, a plurality of device connections electrically connected to the CdTe devices 10 (not shown) are provided. At the second end side facing to the first end side provided with the device connections, the card-edge 29 is formed. The card-edge 29 has a plurality of patterns 29a that can electrically connect the radiation detector 1 with the exterior control circuit. Further, a plurality of electronic parts-mounting portions 26 are provided between the device connections and the card-edge 29. The electronic part mount portions 26 mount electronic parts such as resistors, condensers that are electrically connected to the CdTe devices 10 respectively. Additionally, Application Specific Integrated Circuit (ASIC), Field Programmable Gate Array (FPGA) may be mounted on the electronic parts-mounting portion 26.

As an example, the substrate 20 is formed to have a length in a longer direction, namely, a longitudinal length of approximately 40 mm. Further, the substrate 20 is formed to have a length of approximately 20 mm from an end of a wide part to an end of a narrow part, namely in a short direction from an edge of a region provided with the device connections to an edge of the card-edge 29.

In addition, the substrate 20 has the plurality of columnar substrate terminals 22 between the device connections and the electronic parts-mounting portion 26, and each of the columnar substrate terminals 22 is formed protruding from a surface of the substrate 20 along with a normal direction of the surface of the substrate 20. As an example, four columnar substrate terminals 22 are formed on one surface of the substrate 20. Additionally, the substrate 20 has grounds 28 in corners of the broadly formed region of the substrate 20, and has a plurality of through holes 24 in a region where the grounds 28 are formed. The projection portions 36 of the card holder 30 and the card holder 31 are inserted into the through holes 24.

Further, the device connections, the columnar substrate terminals 22, the electronic parts-mounting portions 26, the grounds 28, and the patterns 29a are symmetrically formed on one surface of the substrate 20 and on the other surface of the substrate 20 respectively, with respect to a conductive film located in a center of a thickness direction of the substrate 20 as a symmetry plane. Additionally, the grounds 28 are respectively formed by removing the insulated layers 20b which cover the conductive film to expose the conductive film.

(Details of the CdTe Device 10)

The CdTe devices 10 in FIG. 3 are fixed to the substrate 20 with an electrically conductive adhesive such as Ag paste. For example, the radiation detector 1 having eight CdTe devices 10 is formed by respectively fixing four CdTe devices 10 to one surface of the substrate 20 and four CdTe devices 10 to the other surface of the substrate 20. Each of the CdTe devices 10 is formed in a substantially rectangular solid, and provided with electrode patterns on a surface connected to the substrate 20 (not shown) and a surface facing to the surface connected to the substrate 20 (not shown) respectively. The radiation enters each edge of the CdTe devices 10, and propagates toward the card-edge 29 in the CdTe devices 10. Herein, the electrode patterns formed on the surface facing to the other surface connected to the substrate 20 are electrically connected to the wiring pattern of the flexible substrate 40. In addition, the CdTe devices 10 as semiconductor devices are used for detecting radiation in this embodiment, however the semiconductor devices are not limited to the CdTe devices 10 as long as the radiation such as γ ray can be detected. For example, compound semiconductor devices such as CdZnTe (CZT) devices, $HgI_2$ devices may be used as the semiconductor devices.

Figure 4:
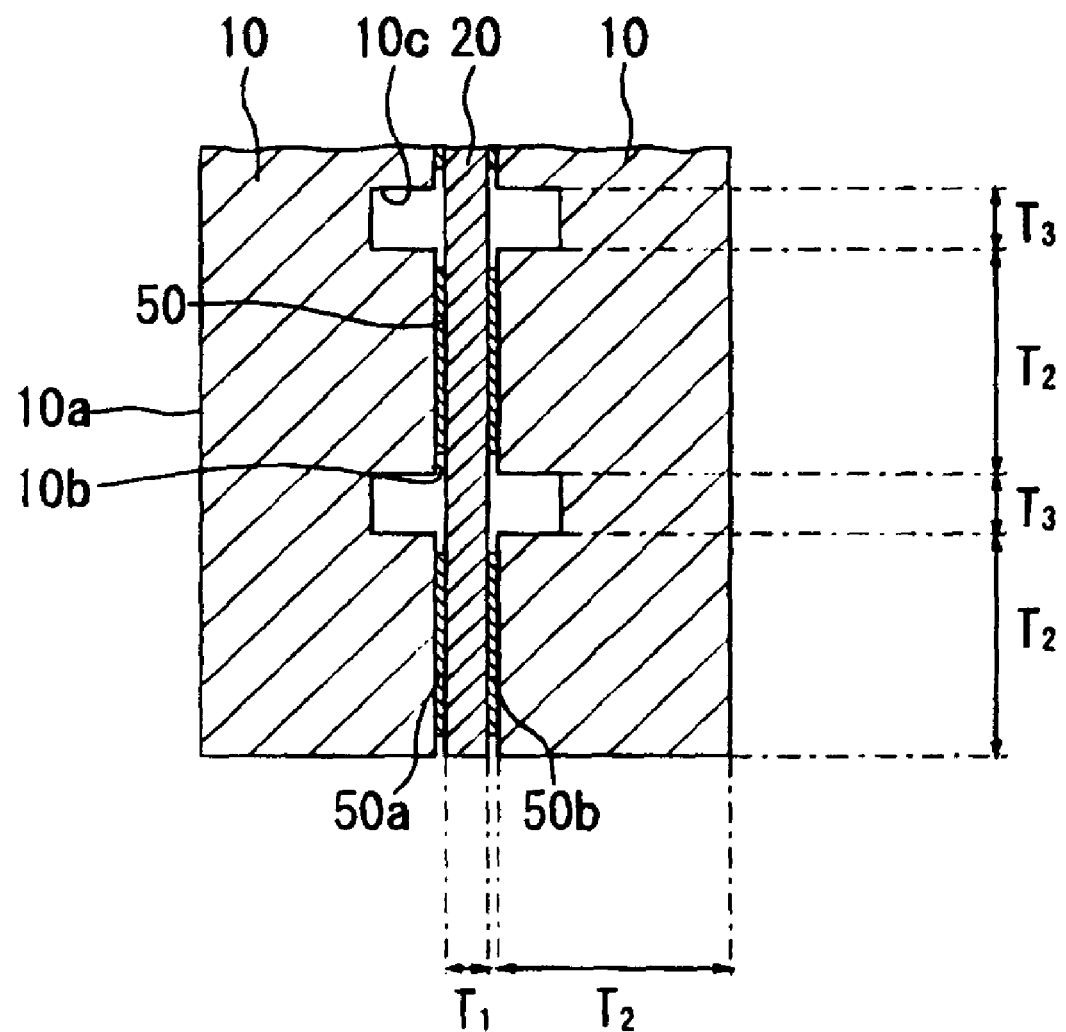
FIG. 4 is a schematic enlarged view from an upper surface of the radiation detector mounting a plurality of the CdTe devices on the substrate in the embodiment according to the present invention.

FIG. 4 is a schematic enlarged view from an upper surface of the radiation detector mounting a plurality of the CdTe devices on the substrate in the embodiment according to the present invention.

The CdTe devices 10 are mounted on each of one surface of the substrate 20 and the other surface and the other surface of the substrate 20. Each CdTe device 10 has electrode patterns (not shown) connected to the wiring pattern of the flexible substrate 40 on a device surface 10a, and has a plurality of grooves 10c on a device surface 10b. In addition, each CdTe device 10 has electrode pattern (not shown) connected to the device connection of the substrate 20 on the device surface 10b located between the grooves 10c.

In addition, the grooves 10c of one of the CdTe devices 10 are formed at substantially even intervals. As an example, one CdTe device 10 has seven grooves 10c. Each part of the CdTe device 10 separated by the grooves 10c is correspondent to a picture cell (i.e. pixel) which detects radiation. Therefore, in the case where one radiation detector 1 has eight CdTe devices 10 (i.e. four groups of a pair of CdTe devices 10) and each CdTe device 10 has eight pixels, one radiation detector 1 will have resolution of 64 pixels. The number of pixels of one CdTe device 10 can be increased or decreased by increasing or decreasing the number of the grooves 10c.

The CdTe device 10 is fixed to the device connections of the substrate 20 with an electrically conductive adhesive 50. A pixel part of one CdTe device 10 is fixed to the substrate 20 with an electrically conductive adhesive 50a, and a pixel part of the other CdTe device 10, which is located at a position of symmetry site of the pixel part of one of the CdTe device 10 with respect to the substrate 20 as the symmetry plane, is fixed to the substrate 20 with an electrically conductive adhesive 50b. The pixel part of one CdTe device 10 and the pixel part of the other CdTe device 10 are electrically connected by a conduction portion (not shown) which passes through the substrate 20.

A thickness $T_1$ of the substrate 20 is 0.3 mm or less, preferably the thickness $T_1$ is 0.2 mm, and a width $T_3$ of the groove 10c is, as an example, 0.2 mm. On the other hand, a thickness $T_2$ of the CdTe device 10 is, as an example, 1.2 mm. In addition, with referring to FIG. 4, a width $T_2$ of one pixel is equal to the thickness $T_2$ of the CdTe device 10. Therefore, the one pixel has a substantially square shape which lacks a corner in the groove 10c. Additionally, each width of the groove 10c of the CdTe device 10 can be determined, for example, depending on an opening size of the collimator or a thickness of the wall separating the openings.

(Details of the Card Holder 30 and the Card Holder 31)

Figure 5A:
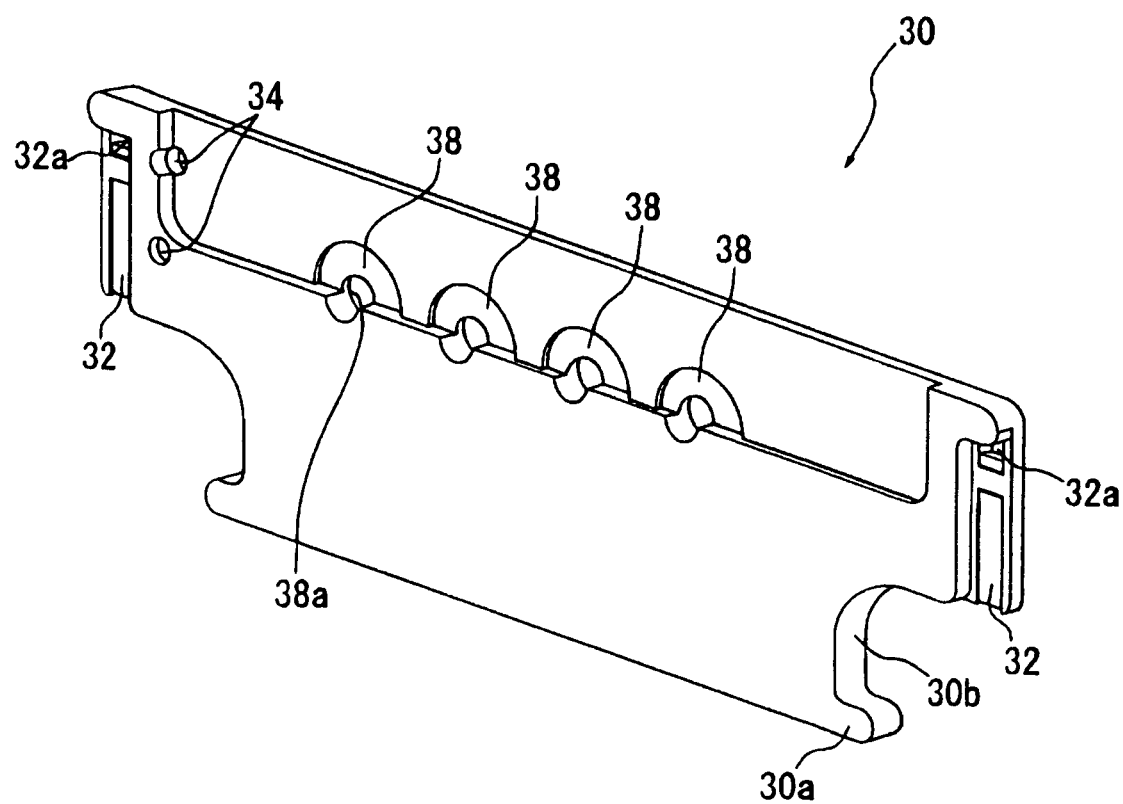
FIG. 5A is a perspective view from a surface side of a card holder in the embodiment according to the present invention.
Figure 5B:
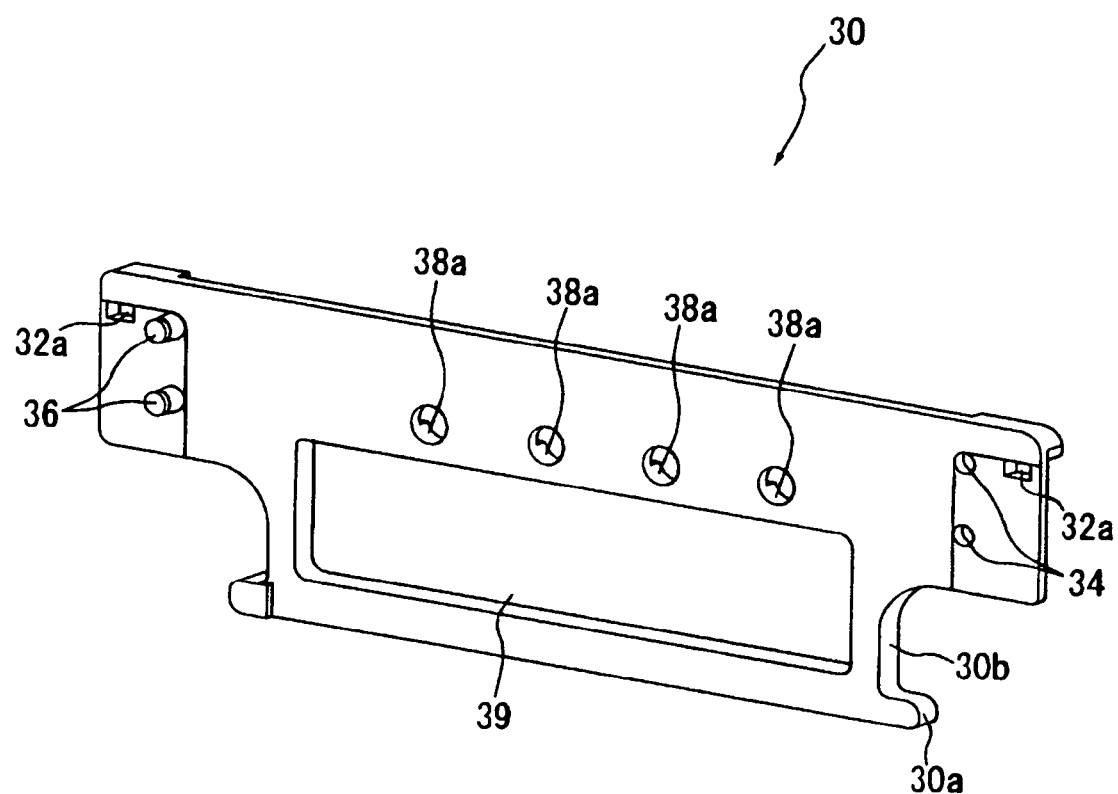
FIG. 5B is a perspective view from a back side of the card holder in the embodiment according to the present invention.

FIG. 5A is a perspective view from a surface side of a card holder in the embodiment according to the present invention, and FIG. 5B is a perspective view from a back side of the card holder in the embodiment according to the present invention.

Because both the card holder 30 and the card holder 31 composing the radiation detector 1 have the same shape, only the card holder 30 is described below.

With referring to FIG. 5A, the card holder 30 comprises an elastic member-mounting portion 32 and a concave portion 32a, to which elastic members are fixed, a plurality of grooved holes 34 into which a projection portion 36 of the card holder 31 paired of the card holder 30 is fitted, a plurality of connections 38 connected to the wiring pattern of the flexible substrate 40, and a plurality of terminal holes 38a through which the substrate terminal 22 of the substrate 20 passes. In addition, the card holder 30 has projections 30a and cutouts 30b at both ends of a lower side respectively, in the case where a side equipped with the CdTe devices 10 of the radiation detector 1 is considered to be an upper side.

With referring to FIG. 5B, the card holder 30 further comprises a plurality of projection portions 36 on a rear face, and the projection portions 36 are fitted in the grooved holes 34 of the card holder 31. The card holder 30 further comprises a recess 39 at a position corresponding to the electronic parts-mounting portions 26 of the substrate 20. Electronic parts mounted on the electronic parts-mounting portions 26 of the substrate 20 are covered with the recess 39 of the card holder 30 and the recess 39 of the card holder 31, so that the electronic parts of one of the radiation detectors 1 are prevented from contacting with the other radiation detector 1 which is adjacent to the one of the radiation detectors 1.

The card holder 30 is equipped with the elastic member-mounting portion 32 and the concave portion 32a at each edge of the longitudinal direction of the card holder 30 respectively. The card holder 30 is further equipped with the connections 38 and the terminal holes 38a near the center of the card holder 30 respectively, in correspondence to the position of the substrate terminal 22 of the substrate 20. Additionally, in the card holder 30, the grooved holes 34 are located at positions that are closer to the elastic member-mounting portion 32 than the terminal hole 38a, which is the closest to the elastic member-mounting portion 32 among the terminal holes 38a, in an area between the elastic member-mounting portion 32 and the connection 38. In addition, the card holder 30 and the card holder 31 may be formed from insulating resin material.

With referring to FIG. 3, when an adjacent area of each CdTe device 10 of the substrate 20 mounting the CdTe devices 10 is sandwiched between the card holder 30 and the card holder 31, the projection portions 36 are inserted in the through holes 24, and the card holder 30 and the card holder 31 are fixed by fitting the projection portions 36 in the grooved holes 34. As a result, a compression force is applied to the substrate 20 sandwiched between the card holder 30 and the card holder 31, so that the substrate 20 is supported by the card holder 30 and the card holder 31.

Figure 6:
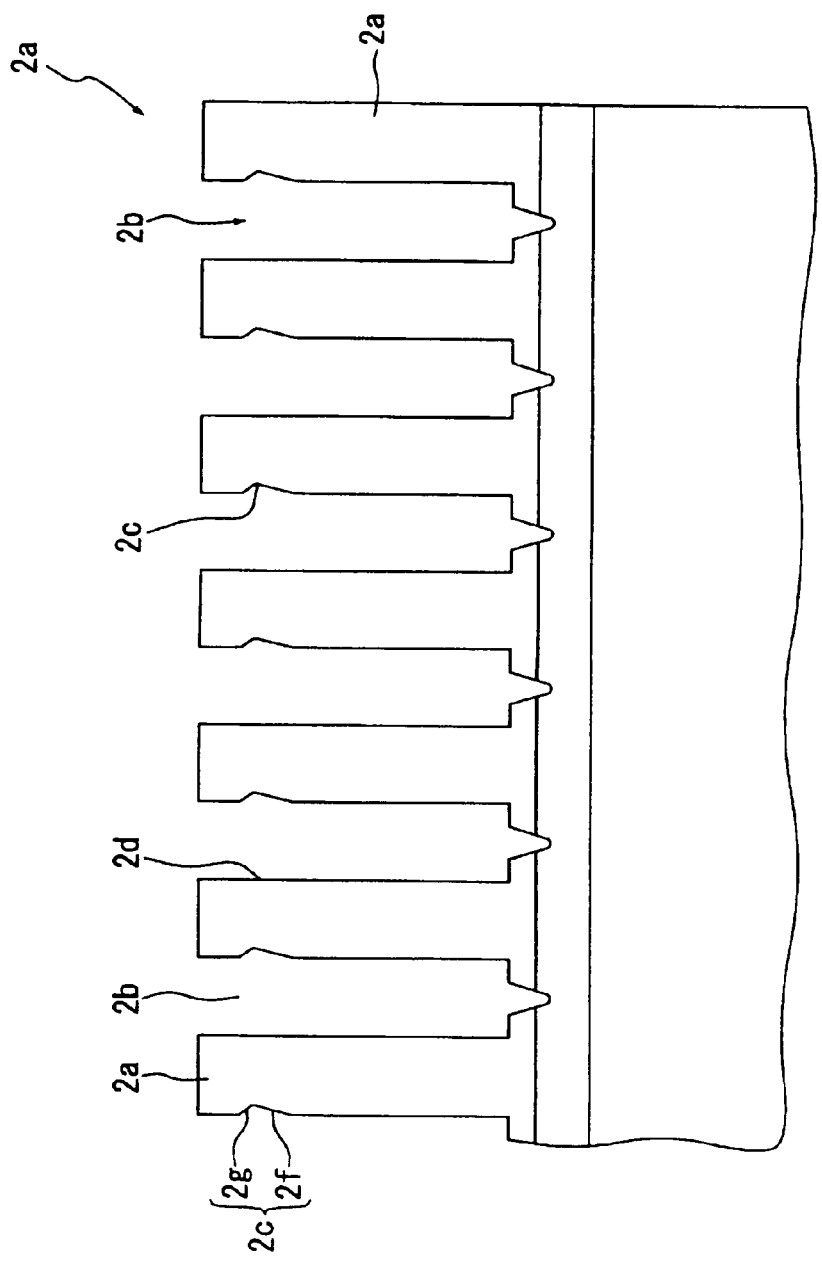
FIG. 6 is a schematic side view of a support of the radiation detector in the embodiment according to the present invention.
Figure 7:
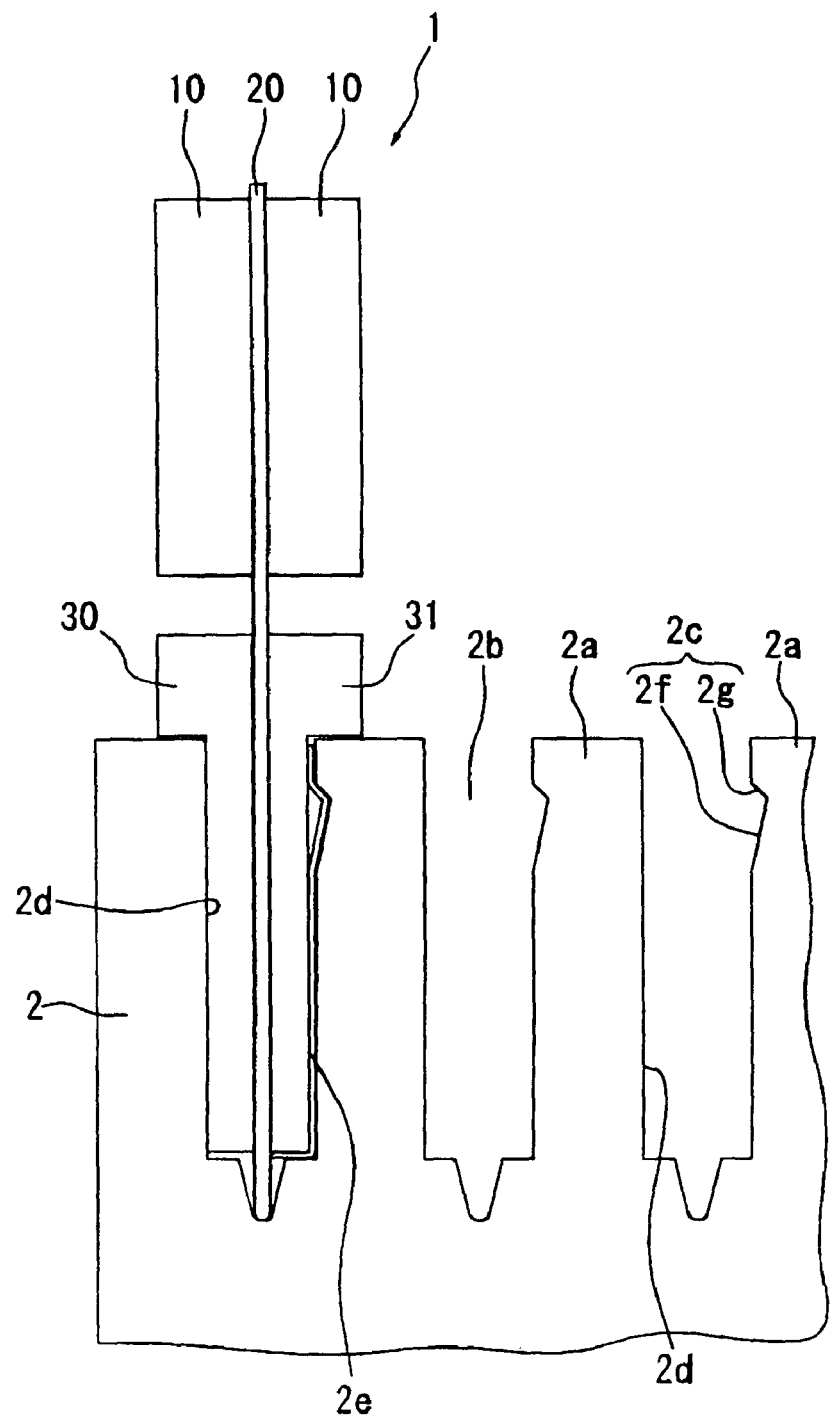
FIG. 7 is a schematic side view of the support of the radiation detector stand into which the radiation detector is inserted in the embodiment according to the present invention.

FIG. 6 is a schematic side view of a support of the radiation detector in the embodiment according to the present invention, and FIG. 7 is a schematic side view of the support of the radiation detector stand into which the radiation detector is inserted in the embodiment according to the present invention.

The radiation detector stand 6 in this embodiment comprises the supports 2 having the trenches 2b arranged at a predetermined interval in relation to the interval of arranging radiation detectors 1, to which the radiation detectors 1 are inserted, the support plate 3 on which the plurality of supports 2 are mounted, and the connectors 4 provided as a plurality of connection members and equipped between the supports 2, the connectors 4 electrically connecting an exterior electric circuit to the radiation detectors 1 when the card-edges 29 of the radiation detectors 1 are connected to the plurality of connectors 4.

The supports 2 are placed on the support plate 3 to be distant from each other with an interval corresponding to the width of the radiation detector 1. With referring to FIG. 6, the supports 2 respectively have a plurality of the wall portions 2a, and the trenches 2b are formed between the wall portions 2a. In other words, each of the supports 2 has comb-like the wall portions 2a. A depression 2c as a locking depression is formed on one surface of the wall portion 2a, and the other surface opposed to the one surface of the wall portion 2a is provided as a flat side 2d. The depression 2c contains a first slope 2f which slopes inward the wall portion 2a, and a second slope 2g having a sharper inclination and a shorter slope than those of the first slope 2f, and the second slope 2g is formed to be more distant from the support plate 3 than the first slope 2f. A region where the first slope 2f and the second slope 2g contact to each other is the most concaved part in the depression 2c.

For example, a spring member 2e is incorporated in the elastic member-mounting portion 32 and the concave portion 32a of the radiation detector 1. The spring member 2e is provided as an elastic member comprising a metal plate, which can be formed thinner than a resin spring and be excellent in radiation durability and mechanical endurance. The spring member 2e is formed to have a shape corresponding to an outer surface of the depression 2c. When the radiation detector 1 is inserted in the trenches 2b of the supports 2, the radiation detector 1 is pressed to the flat side 2d of the wall portion 2a. Specifically, the spring members 2e press the card holder 30 and the card holder 31 of the radiation detector 1 to the flat side 2d. As a result, the radiation detector 1 is fixed to the support 2. Because of being pressed the radiation detector 1 to the flat side 2d, each position of the radiation detectors 1 to the support 2 can be determined or controlled based on the position of each flat side 2d to support 2. Namely, the position of the radiation detector 1 can be controlled by the flat side 2d as a reference surface.

In addition, because the inclination of the second slope 2g of the depression 2c is sharper than that of the first slope 2f, it is possible to prevent the radiation detector 1 from dropping off the support 2 after inserting the radiation detector 1 in the trench 2b. Further, because the inclination of the first slope 2f is gentler than that of the second slope 2g, it is possible to easily insert the radiation detector 1 in the trench 2b. Still further, in this embodiment, the depressions 2c are respectively formed on the surface of the wall portions 2a, for example, in the same direction. By adjusting an elastic force of the spring member 2e, it is possible to control a force by which the spring member 2e fixes the radiation detector 1 to the support 2.

Each of the supports 2 is formed from a metal material with means of processing such as die-casting, cutting work, sheet metal processing, wire-cut, and laser material processing. For example, the support 2 having the wall portions 2a with the depressions 2c is formed by cutting work of the metal material. Because the support 2 is formed by cutting work of the metal material, a distance from the flat side 2d of one of the wall portions 2a to the flat side 2d of the other wall portion 2a located next to the one of the wall portions 2a can be controlled at least within a range of the dimension error of ±0.05 mm. The dimension error is, for example, ±0.02 mm when the cutting work is used, and the dimension error is ±0.01 mm when the wire-cut is used. Further, the dimension error can be reduced to ±0.05 mm when the support 2 is formed by the die-casting.

The support 2 may be also formed by the combination of the cutting work and the sheet metal processing of the metal material. In addition, it is preferable to use the metal material with high thermal conductivity, light weight, and high mechanical strength, which can be manufactured with high dimensional accuracy for the support 2, for example, aluminum.

In addition, the collimator having the openings is provided on or above the radiation detectors 1, namely on the opposite side of the support plate 3 of the radiation detector 1 although the collimator is not shown in FIG. 7. The reason for using the collimator is to inhibit the radiation scattered at the test subject from entering into the CdTe devices 10, and to detect only the radiation from the certain direction by the CdTe devices 10.

The respective connectors 4 mounted on the support plate 3 are arranged on the support plate 3 at positions corresponding to the locations of the trenches 2b of the support 2. However, since the substrate 20 of the radiation detector 1 has the flexibility and the card-edge 29 formed in part of the substrate 20 has also the flexibility, it is allowed that the positions of the connectors 4 are misaligned within the range of inflecting of the card-edge 29.

Figure 8:
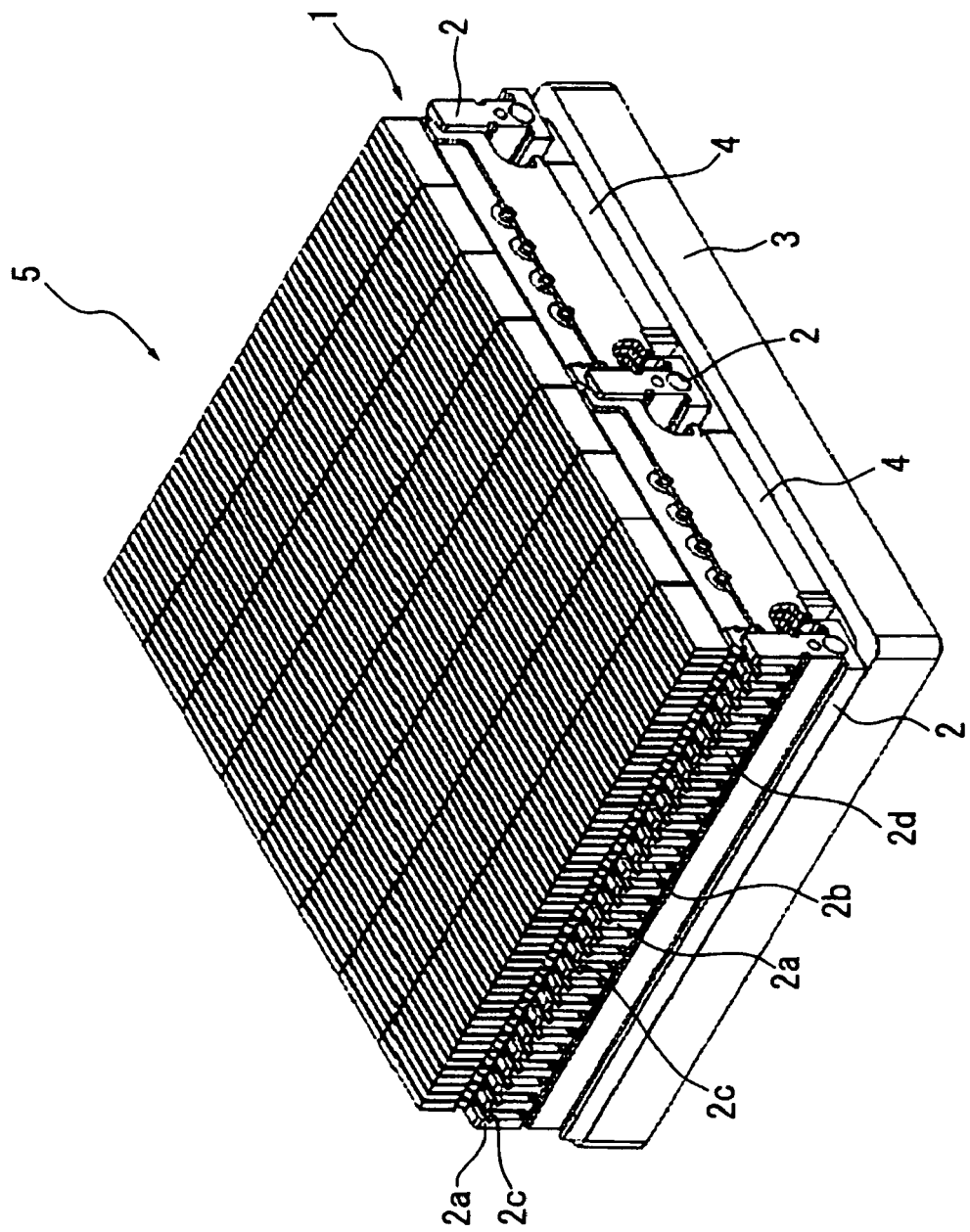
FIG. 8 is a schematic view of a radiation detector assembly comprising the radiation detector stand to which a plurality of the radiation detectors are inserted in the embodiment according to the present invention.
Figure 9:
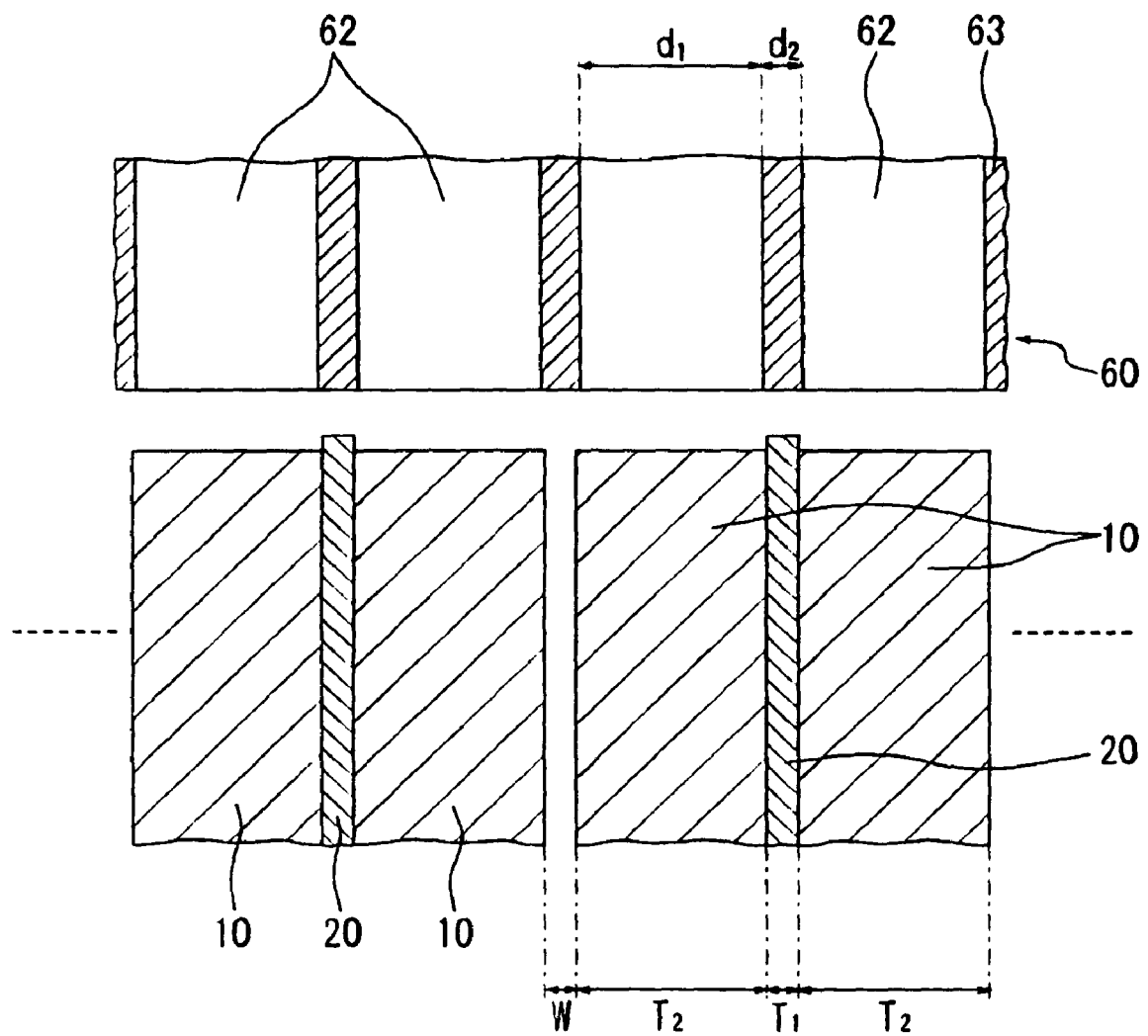
FIG. 9 is a schematic partial cross sectional view of the radiation detectors with a collimator when the radiation detectors are inserted in and fixed to the radiation detector stand in the embodiment according to the present invention.

FIG. 8 is a schematic view of a radiation detector assembly comprising the radiation detector stand to which a plurality of the radiation detectors are inserted in the embodiment according to the present invention, and FIG. 9 is a schematic partial cross sectional view of the radiation detectors with a collimator when the radiation detectors are inserted in and fixed to the radiation detector stand in the embodiment according to the present invention. In addition, in FIG. 9, the flexible substrates are not shown for convenience sake of explanation.

A radiation detecting apparatus 5 having the radiation detectors 1 arranged closely in parallel to each other, as shown in FIG. 8, is composed by inserting the radiation detectors 1 in the trenches 2b respectively, and impressing the radiation detector 1 to the support 2 with the spring member 2e between the trench 2b and the elastic member-mounting portion 32.

With referring to FIG. 9, a collimator 60 is placed over the radiation detectors 1 to cover the radiation detectors 1. When using the collimator 60, it is required that each position of a plurality of openings 62 of the collimator 60 corresponds to each position of a plurality of pixels of the CdTe device 10. In the case where the correspondence relation therebetween is shifted, walls 63 ("wall" may be also termed as "dividing wall" or "septa"), which separate the openings 62 of the collimator 60 from each other, may be located at positions of the pixels. In this case, because the walls 63 are located on the pixels, it is impossible to appropriately detect the radiation by these pixels.

Therefore, in order to prevent an area of the pixels of the CdTe devices 10 from being covered with the walls 63 of the collimator 60, it is required to achieve high location accuracy with respect to the collimator 60 of the radiation detectors 1 by narrowing the interval between the radiation detectors 1. Further, in the case of improving the resolution of the radiation detecting apparatus 5 by diminishing each opening size $d_1$ of the openings 62 of the collimator 60, higher location accuracy is required. Herein, the collimator 60 may be formed from a material such as lead (Pb) and tungsten (W).

Because the radiation detector 1 is provided with the substrate 20 having a thickness $T_1$ which is equal to or not greater than a thickness $d_2$ of the wall 63 which separates the openings 62 of the collimator 60 from each other, an interval W between the radiation detectors 1 can be set to be not greater than the thickness $d_2$ of the wall 63. In addition, the radiation detectors 1 may be arranged closely with the high location accuracy by forming the trenches 2b of the support 2 with the location accuracy corresponding to the interval W.

The support 2 of the radiation detector stand 6 in this embodiment has the flat side 2d formed at a predetermined interval on one surface of the wall portion 2a, and the flat sides 2d are formed respectively with high dimensional accuracy. For example, in the case where the thickness $T_1$ of the substrate 20 is 0.2 mm, the thickness $T_2$ of the CdTe device 10 is 1.2 mm, and the interval W between the radiation detectors 1 is 0.2 mm, the radiation detectors 1 may be arranged every 2.8 mm±0.02 mm by adjusting an interval between the flat side 2d of one wall portion 2a of the support 2 formed by cutting work of the metal material and the flat side 2d of the other wall portion 2a adjacent to the one wall portion 2a to 2.8 mm±0.02 mm.

Effect of the Embodiment

According to the radiation detector stand 6 in the embodiment of the present invention, since a positional precision of the flat side 2d with respect to the support 2 is maintained high, i.e. the flat side 2d to the support 2 is formed with high positional precision, in the case where the radiation detectors 1 are inserted and fixed into the trenches 2b respectively, it is possible to match each position of the radiation detectors 1 to the position of the collimator 60 with high positional precision.

Further, in this embodiment of the present invention, since each interval between the radiation detectors 1 is controlled by the interval between the flat sides 2d of the wall portions 2a, it is possible to considerably improve a mounting accuracy of the radiation detector 1 by absorbing an assembling tolerance with the width of the trench 2b, even if there is the assembling tolerance because of the dispersion in thickness of the substrate 20, the card holder 30 or the card holder 31, which composes the radiation detector 1.

Further, according to the radiation detector stand 6 in this embodiment of the present invention, since it is possible to control the interval between the radiation detectors 1 by controlling the interval between the flat sides 2d of the wall portions 2a, it is possible to easily improve the mounting accuracy of the radiation detectors 1. Still further, it is possible to provide a substantially uniform interval between the radiation detectors 1 in any position, by keeping the flat sides 2d in the same direction such as the support 2 in this embodiment of the present invention, and keeping the intervals between the flat sides 2d substantially identical.

Further, because the support 2 of the radiation detector stand 6 may be formed from the metal material with the high thermal conductivity, a heat between the radiation detectors 1 can be easily dissipated from the radiation detecting apparatus 5. Thereby, it is possible to decrease dispersion in temperature in the entire radiation detecting apparatus 5, and to suppress an erroneous operation of the radiation detector 1.

Further, in this embodiment of the present invention, since the thickness of the substrate 20 of the radiation detector 1 can be reduced and that the interval between the radiation detectors 1 can be narrowed, it is possible to reduce the dead zone in which the radiation cannot be detected by each radiation detector 1, and to increase the amount of the radiation which can be detected by the radiation detecting apparatus 5. As a result, since it is possible to suppress lowering of the amount of the radiation detected with the radiation detecting apparatus 5 even if the amount of the radiation irradiated to the test subject is less, it is possible to reduce the amount of the radiation to be irradiated to the test subject.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A radiation detector stand comprising:
a first support having a plurality of first trenches to which a plurality of radiation detectors for detecting a radiation are inserted, the first trenches being arranged at a predetermined interval corresponding to an interval of arranging the radiation detectors;
a second support arranged in parallel to the first support, the second support having a plurality of second trenches to which the radiation detectors are inserted, the second trenches being arranged at the predetermined interval; and
a substantially flat plate on which the first and second supports are arranged.

2. The radiation detector stand according to claim 1, further comprising:
elastic members placed between each of the first trenches and each of the radiation detectors and between each of the second trenches and each of the radiation detectors, wherein the elastic members presses each of the radiation detectors to the first support and the second support.

3. The radiation detector stand according to claim 2, wherein the first trenches and the second trenches are formed respectively between a plurality of wall portions, each of the wall portions contains a flat side and a locking depression formed on a surface opposed to the flat side, each of the elastic members is formed with a shape corresponding to the locking depression, and each of the elastic members can press the radiation detector to the flat side.

4. The radiation detector stand according to claim 3, wherein the first support and the second support are respectively formed from a metal material.

5. The radiation detector stand according to claim 4, further comprising:
a support plate mounting the first support and the second support, and
a plurality of connection members connected to the radiation detectors respectively and provided between the first support and the second support, the connection members connecting an exterior electric circuit with the radiation detectors.

6. A radiation detector stand comprising:
- a first support having a plurality of first trenches to which a plurality of radiation detectors for detecting a radiation are inserted, the first trenches being arranged at a predetermined interval corresponding to an interval of arranging the radiation detectors;
- a second support arranged in parallel to the first support, the second support having a plurality of second trenches to which the radiation detectors are inserted, the second trenches being arranged at the predetermined interval; and
- elastic members placed between each of the first trenches and each of the radiation detectors and between each of the second trenches and each of the radiation detectors, wherein the elastic members presses each of the radiation detectors to the first support and the second support.

7. The radiation detector stand according to claim 6, wherein the first trenches and the second trenches are formed respectively between a plurality of wall portions, each of the wall portions contains a flat side and a locking depression formed on a surface opposed to the flat side, each of the elastic members is formed with a shape corresponding to the locking depression, and each of the elastic members can press the radiation detector to the flat side.

8. The radiation detector stand according to claim 7, wherein the first support and the second support are respectively formed from a metal material.

9. The radiation detector stand according to claim 8, further comprising:
- a support plate mounting the first support and the second support, and
- a plurality of connection members connected to the radiation detectors respectively and provided between the first support and the second support, the connection members connecting an exterior electric circuit with the radiation detectors.

10. The radiation detector stand according to claim 7, wherein the locking depression has a first slope and a second slope with an inclination sharper than that of the first slope.

11. The radiation detector stand according to claim 8, wherein the locking depression has a first slope and a second slope with an inclination sharper than that of the first slope.

* * * * *